United States Patent
Katano et al.

(10) Patent No.: US 8,105,730 B2
(45) Date of Patent: Jan. 31, 2012

(54) FUEL CELL SYSTEM WITH AN INJECTOR AND HAVING A FAILURE DETECTION DEVICE FOR THE INJECTOR AND A PRESSURE SENSOR UPSTREAM OF THE INJECTOR

(75) Inventors: Koji Katano, Toyota (JP); Norio Yamagishi, Aichi (JP); Akihisa Hotta, Ichinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 440 days.

(21) Appl. No.: 12/438,410

(22) PCT Filed: Jul. 6, 2007

(86) PCT No.: PCT/JP2007/063931
§ 371 (c)(1),
(2), (4) Date: Mar. 26, 2009

(87) PCT Pub. No.: WO2008/023503
PCT Pub. Date: Feb. 28, 2008

(65) Prior Publication Data
US 2010/0233581 A1 Sep. 16, 2010

(30) Foreign Application Priority Data
Aug. 25, 2006 (JP) .................................. 2006-229770

(51) Int. Cl.
*H01M 8/04* (2006.01)
(52) U.S. Cl. ........................................ 429/513
(58) Field of Classification Search .................. 429/443, 429/444, 428, 512–517
See application file for complete search history.

(56) References Cited

U.S. PATENT DOCUMENTS

| | | | |
|---|---|---|---|
| 2003/0012989 A1* | 1/2003 | Ueda et al. | 429/22 |
| 2007/0218327 A1* | 9/2007 | Ishikawa et al. | 429/22 |

FOREIGN PATENT DOCUMENTS

| | | |
|---|---|---|
| JP | 2003-92125 A | 3/2003 |
| JP | 2003-308865 A | 10/2003 |
| JP | 2003-308868 A | 10/2003 |
| JP | 2005-123093 A | 5/2005 |
| JP | 2005-302563 A | 10/2005 |
| JP | 2006-134861 A | 5/2006 |
| JP | 2006-141122 A | 6/2006 |
| JP | 2006-210055 A | 8/2006 |
| JP | 2007-165237 A | 6/2007 |
| WO | WO 2005/119823 A1 | 12/2005 |

* cited by examiner

*Primary Examiner* — Chandrika Prasad
(74) *Attorney, Agent, or Firm* — Kenyon & Kenyon LLP

(57) ABSTRACT

A fuel cell system having a fuel cell, a fuel supply flow path for allowing a fuel gas supplied from a fuel supply source to flow to the fuel cell, an on-off valve for regulating the state of the gas on the upstream side of the fuel supply flow path to supply it to the downstream side, failure detection means for detecting whether the on-off valve has a closure failure, a pressure sensor for detecting the pressure value of the fuel gas on the upstream side of the on-off valve, and determination condition setting means for setting, based on the pressure value detected by the pressure sensor, the conditions of determination of the closure failure of the on-off valve. The failure detection means determines whether the on-off valve has the closure failure, based on the closure failure determination conditions set by the determination condition setting means.

3 Claims, 6 Drawing Sheets

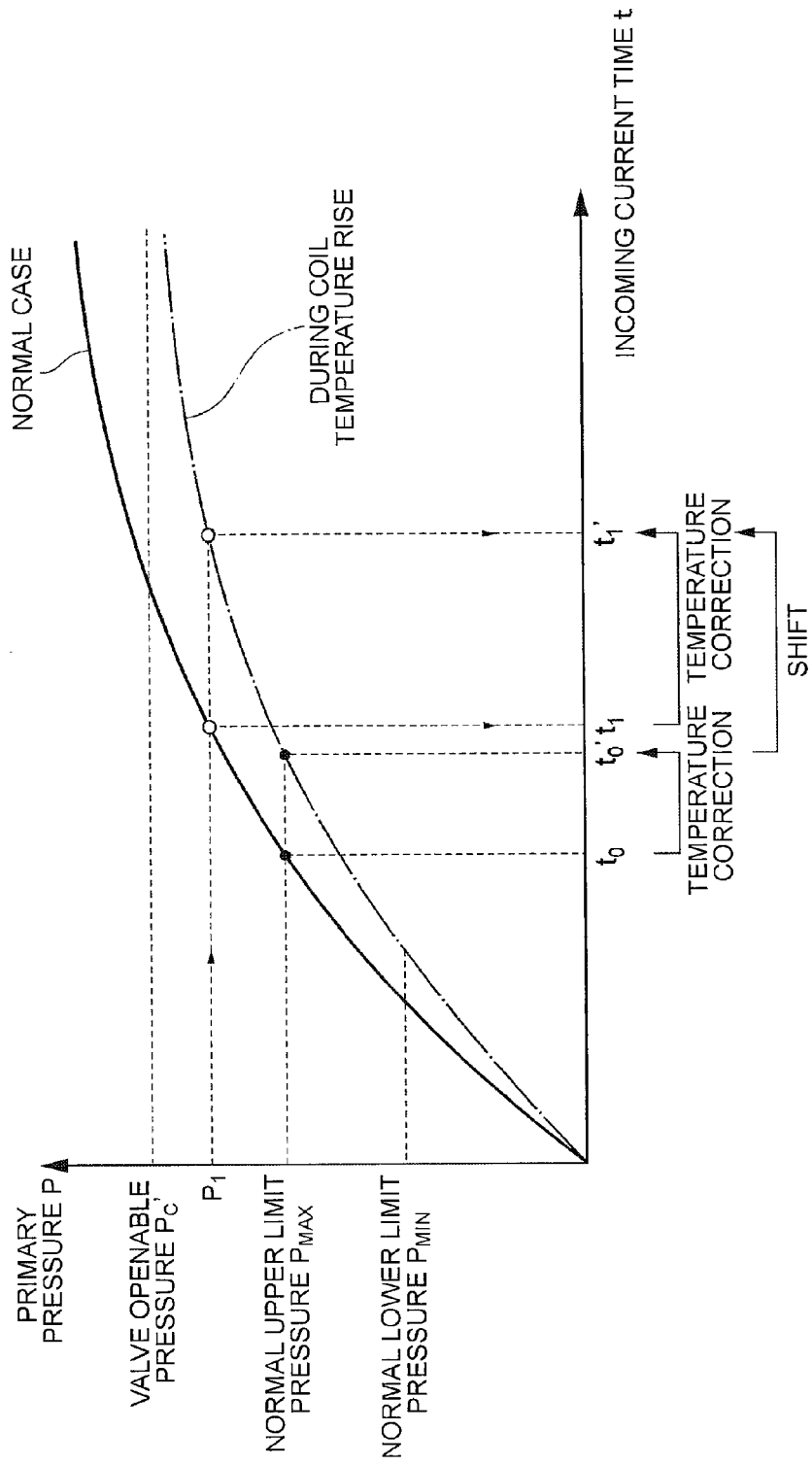

FUEL CELL SYSTEM WITH AN INJECTOR AND HAVING A FAILURE DETECTION DEVICE FOR THE INJECTOR AND A PRESSURE SENSOR UPSTREAM OF THE INJECTOR

This is a 371 national phase application of PCT/JP2007/063931 filed 6 Jul. 2007, which claims priority to Japanese Patent Application No. 2006-229770 filed 25 Aug. 2006, the contents of which are incorporated herein by reference.

TECHNICAL FIELD

The present invention relates to a fuel cell system and a method of diagnosing an on-off valve.

BACKGROUND ART

Heretofore, a fuel cell system including a fuel cell for receiving the supply of a reactant gas (a fuel gas and an oxidizing gas) to generate a power has been suggested and put to practical use. Such a fuel cell system is provided with a fuel supply flow path for allowing the fuel gas supplied from a fuel supply source such as a hydrogen tank to flow to the fuel cell, and the fuel supply flow path is generally provided with a pressure adjustment valve (a regulator) which decreases the supply pressure of the fuel gas from the fuel supply source to a predetermined value. At present, a technology has been suggested in which a mechanical variable pressure adjustment valve (a variable regulator) for changing the supply pressure of the fuel gas in, for example, two stages is provided in the fuel supply flow path to change the supply pressure of the fuel gas in accordance with the operation state of the system.

Moreover, in recent years, a technology has been suggested in which an injector is arranged in the fuel supply flow path of the fuel cell system, and the operation state of this injector is controlled to regulate the supply pressure of the fuel gas in the fuel supply flow path. The injector is an electromagnetic driving type on-off valve in which a valve body can directly be driven with an electromagnetic driving force for a predetermined drive cycle and detached from a valve seat to regulate the state of the gas (a gas flow rate or a gas pressure). A control device drives the valve body of the injector to control a jet timing or a jet time of the fuel gas, whereby the flow rate or the pressure of the fuel gas can be controlled. In recent years, there has been suggested a technology for detecting a trouble (a closure failure such as valve adhering) of an electromagnetic driving type on-off valve such as this injector (e.g., see Japanese Patent Application Laid-Open No. 2005-302563).

DISCLOSURE OF THE INVENTION

Heretofore, to determine whether or not an electromagnetic driving type on-off valve such as an injector has a closure failure at the startup of a system, the on-off valve is energized to determine the closure failure of the on-off valve at a time when this energizing time passes a predetermined reference time. In such a conventional closure failure determination technology, as the predetermined reference time, the energizing time (an incoming current time) for obtaining a current necessary for opening the on-off valve is employed.

However, during the stop of the system, when gas leakage, transmission or the like is generated from a shut valve or a regulator arranged on the upstream side of the on-off valve, the pressure value (a primary pressure) of the fuel gas on the upstream side of the on-off valve sometimes rises in excess of an assumed value. In the above conventional closure failure determination technology, even in a situation where the on-off valve does not easily open owing to such a primary pressure rise, the closure failure determination is uniformly performed after an elapse of a predetermined incoming current time, so that although the closure failure is actually not generated in the on-off valve, it is sometimes wrongly determined that the closure failure is generated, which falls in a state where the system cannot start.

The present invention has been developed in view of such a situation, and an object thereof is to correctly realize the determination of the closure failure of an on-off valve, even when the pressure value (the primary pressure) of the fuel gas on the upstream side of the on-off valve rises in a fuel cell system having the on-off valve.

To achieve the above object, a fuel cell system according to the present invention is a fuel cell system comprising: a fuel cell; a fuel supply flow path which allows a fuel gas supplied from a fuel supply source to flow to the fuel cell; an on-off valve which regulates the state of the gas on the upstream side of this fuel supply flow path to supply the gas to the downstream side; failure detection means for detecting whether this on-off valve has a closure failure; a pressure sensor which detects the pressure value of the fuel gas on the upstream side of the on-off valve; and determination condition setting means for setting, based on the pressure value detected by this pressure sensor, the conditions of determination of the closure failure of the on-off valve, wherein the failure detection means determines, based on the closure failure determination conditions set by the determination condition setting means, whether the on-off valve has the closure failure.

Moreover, a diagnosing method according to the present invention is a method of diagnosing an on-off valve of a fuel cell system including a fuel cell, a fuel supply flow path which allows a fuel gas supplied from a fuel supply source to flow to the fuel cell, and an on-off valve which regulates the state of the gas on the upstream side of this fuel supply flow path to supply the gas to the downstream side, the method comprising: a first step of detecting the pressure value of the fuel gas on the upstream side of the on-off valve; a second step of setting, based on the pressure value detected by the first step, the conditions of determination of a closure failure of the on-off valve; and a third step of determining, based on the closure failure determination conditions set by the second step, whether the on-off valve has the closure failure.

In a case where such constitution and method are employed, even when the pressure value (the primary pressure) of the fuel gas on the upstream side of the on-off valve changes, the determination of the closure failure of the on-off valve can correctly be realized. For example, when the on-off valve does not easily open owing to the rising of the primary pressure, the closure failure determination conditions can be relaxed to suppress the wrong determination of the closure failure of the on-off valve. In consequence, the system can be prevented from falling in a state in which the system cannot start. It is to be noted that "the state of the gas" is a gas state represented by a flow rate, a pressure, a temperature, a mol concentration or the like, and especially includes at least one of the gas flow rate and the gas pressure.

Moreover, in the above fuel cell system and the diagnosing method, an injector can be employed as the on-off valve.

Furthermore, the above fuel cell system can employ the determination condition setting means for setting an energizing time to obtain a current value necessary for the opening of the injector as the closure failure determination condition and for changing the energizing time in accordance with the detected pressure value, when the detected pressure value exceeds a predetermined threshold value.

When such a constitution is employed, the energizing time (an incoming current time) for obtaining the current value necessary for opening the injector can be used as the closure failure determination condition. Moreover, when the pressure value (the primary pressure) of the fuel gas on the upstream side of the injector rises and exceeds the predetermined threshold value, the closure failure determination conditions (the incoming current time) can be changed in accordance with the pressure value. Therefore, even when the injector does not easily open owing to the rising of the primary pressure, the determination of the closure failure of the injector can correctly be realized.

Moreover, in the fuel cell system, it is preferable to employ the determination condition setting means for correcting the energizing time based on the temperature of the injector.

When such a constitution is employed, the energizing time (the incoming current time) as the closure failure determination condition can be corrected based on the temperature of the injector. Therefore, even when the temperature of the injector rises to enlarge a resistance and hence the energizing time for obtaining the current necessary for opening the injector becomes longer than usual, the closure failure determination condition (the incoming current time) can be corrected to correctly realize the determination of the closure failure of the injector.

According to the present invention, in the fuel cell system having the on-off valve, even when the pressure value (the primary pressure) of the fuel gas on the upstream side of the on-off valve rises, the determination of the closure failure of the on-off valve can correctly be realized.

BRIEF DESCRIPTION OF THE DRAWINGS

FIG. 6 is a map showing a relation among the closure failure determination conditions of the injector of the fuel cell system shown in FIG. 1, the primary pressure and the coil temperature of the injector.

BEST MODE FOR CARRYING OUT THE INVENTION

Hereinafter, a fuel cell system 1 according to an embodiment of the present invention will be described with reference to the drawings. In the present embodiment, an example in which the present invention is applied to a car-mounted power generation system of a fuel cell vehicle will be described.

Figure 1:
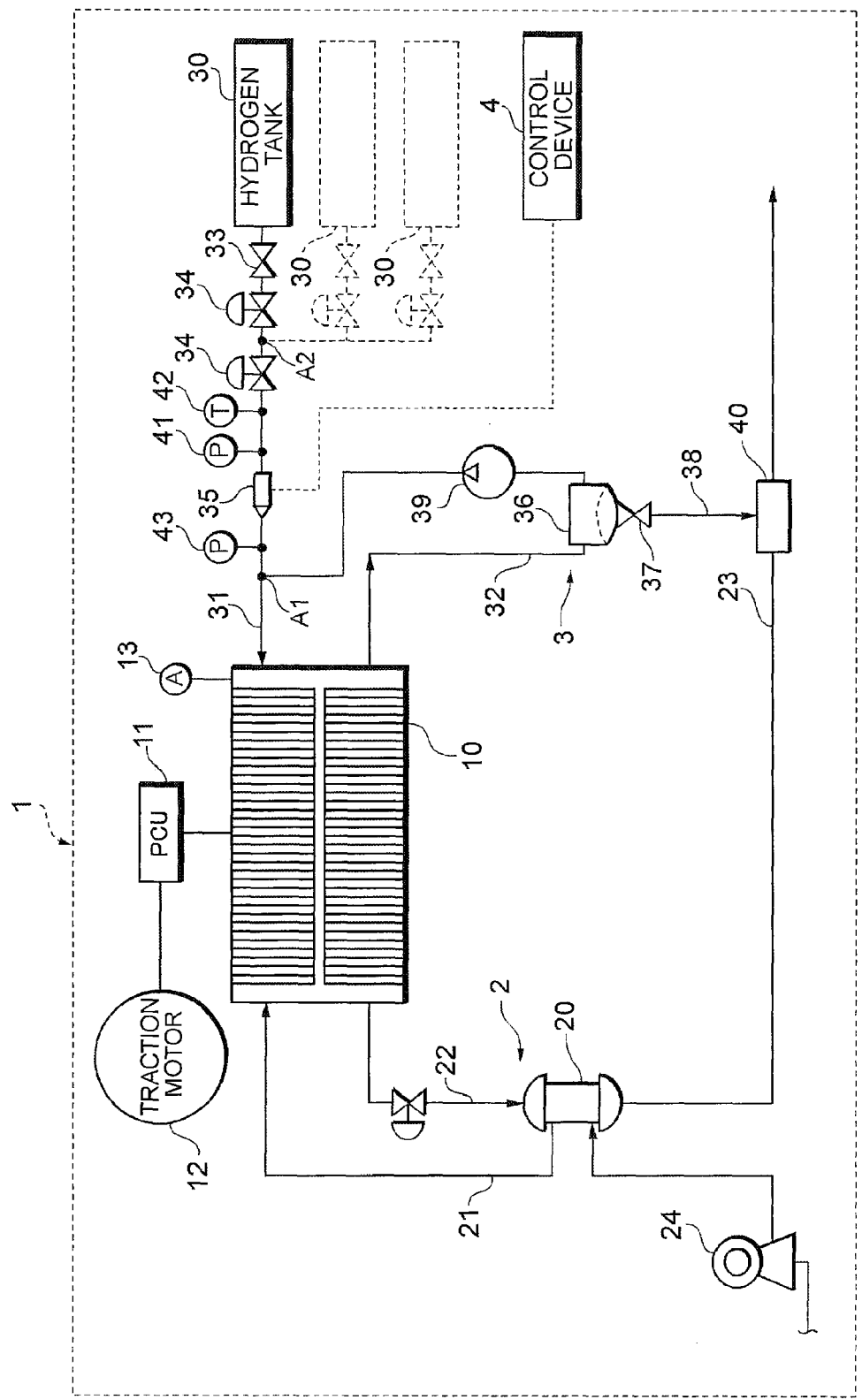
FIG. 1 is a constitution diagram of a fuel cell system according to an embodiment of the present invention.

First, a constitution of the fuel cell system 1 according to the embodiment of the present invention will be described with reference to FIGS. 1 to 3. As shown in FIG. 1, the fuel cell system 1 according to the present embodiment includes a fuel cell 10 which receives the supply of a reactant gas (an oxidizing gas and a fuel gas) to generate a power; an oxidizing gas piping system 2 which supplies air as the oxidizing gas to the fuel cell 10; a hydrogen gas piping system 3 which supplies a hydrogen gas as the fuel gas to the fuel cell 10; a control device 4 which generally controls the whole system and the like.

The fuel cell 10 has a stack structure in which the required number of unitary cells for receiving the supply of the reactant gas to generate the power are laminated. The power generated by the fuel cell 10 is supplied to a power control unit (PCU) 11. The PCU 11 includes an inverter, a DC-DC converter and the like arranged between the fuel cell 10 and a traction motor 12. Moreover, a current sensor 13 which detects a current during the power generation is attached to the fuel cell 10.

The oxidizing gas piping system 2 includes an air supply flow path 21 for supplying the oxidizing gas (air) humidified by a humidifier 20 to the fuel cell 10, an air discharge flow path 22 for guiding an oxidizing off-gas, which is discharged from the fuel cell 10, to the humidifier 20, and an exhaust flow path 23 for guiding the oxidizing off-gas from the humidifier 21 to the outside. The air supply flow path 21 is provided with a compressor 24 which takes the oxidizing gas from the atmosphere to feed the gas under pressure to the humidifier 20.

The hydrogen gas piping system 3 includes a hydrogen tank 30 as a fuel supply source in which the hydrogen gas having a high pressure is received; a hydrogen supply flow path 31 as a fuel supply flow path for supplying the hydrogen gas from the hydrogen tank 30 to the fuel cell 10; and a circulation flow path 32 for returning a hydrogen off-gas, which is discharged from the fuel cell 10, to the hydrogen supply flow path 31. It is to be noted that instead of the hydrogen tank 30, a reformer which forms a hydrogen-rich reformed gas from a hydrocarbon-based fuel, and a high-pressure gas tank which brings the reformed gas formed by this reformer into a high-pressure state to accumulate the pressure may be employed as fuel supply sources. Alternatively, a tank having a hydrogen occluded alloy may be employed as the fuel supply source.

The hydrogen supply flow path 31 is provided with a shut valve 33 which shuts or allows the supply of the hydrogen gas from the hydrogen tank 30, a regulator 34 which regulates the pressure of the hydrogen gas, and an injector 35. Moreover, on the upstream side of the injector 35, a primary pressure sensor 41 and a temperature sensor 42 are provided to detect the pressure and temperature of the hydrogen gas in the hydrogen supply flow path 31. Furthermore, on the downstream side of the injector 35 and on the upstream side of a joining part A1 between the hydrogen supply flow path 31 and the circulation flow path 32, there is provided a secondary pressure sensor 43 which detects the pressure of the hydrogen gas in the hydrogen supply flow path 31.

The regulator 34 is a device which adjusts the upstream pressure (the primary pressure) to a preset secondary pressure. In the present embodiment, a mechanical pressure reduction valve which reduces the primary pressure is employed as the regulator 34. As the constitution of the mechanical pressure reduction valve, a known constitution may be employed which has a housing provided with a back pressure chamber and a pressure adjustment chamber formed via a diaphragm, and the primary pressure is reduced to a predetermined pressure by the back pressure of the back pressure chamber to form the secondary pressure in the pressure adjustment chamber. In the present embodiment, as shown in FIG. 1, when two regulators 34 are arranged on the upstream side of the injector 35, the upstream pressure of the injector 35 can effectively be decreased. In consequence, a degree of freedom of design of a mechanical structure (a valve body, a housing, a flow path, a driving device, etc.) of the injector 35 can be increased. Moreover, since the upstream pressure of the injector 35 can be decreased, it can be prevented that the valve body of the injector 35 does not easily move owing to increase of a difference between the upstream pressure and the downstream pressure of the injector 35. Therefore, the variable pressure adjustment range of the downstream pressure of the injector 35 can be increased, and the lowering of the response of the injector 35 can be suppressed.

The injector 35 is an electromagnetic driving type on-off valve in which a valve body is directly driven with an electromagnetic driving force for a predetermined drive cycle and detached from a valve seat, whereby a gas flow rate or a gas pressure can be regulated. The injector 35 includes the valve seat having a jet hole which jets a gas fuel such as the hydrogen gas, and also includes a nozzle body which supplies and guides the gas fuel to the jet hole, and the valve body movably received and held in an axial direction (a gas flow direction) with respect to this nozzle body to open or close the jet hole. In the present embodiment, the valve body of the injector 35 is driven by a solenoid which is an electromagnetic driving device, and a pulse-like excitation current supplied to this solenoid can be turned on or off to switch the opening area of the jet hole in two stages or multiple stages. A gas jet time and a gas jet timing of the injector 35 are controlled by a control signal output from the control device 4, to precisely control the flow rate and pressure of the hydrogen gas. In the injector 35, the valve (the valve body and the valve seat) is directly driven by the electromagnetic driving force to open or close, and the drive cycle of the valve can be controlled in a high-response region (e.g., several ms to several ten ms), so that the injector has a high response.

To supply the demanded gas flow rate to the downstream side of the injector 35, at least one of the opening area (degree) and an opening time of the valve body provided in the gas flow path of the injector 35 is changed to regulate the flow rate (or the hydrogen mol concentration) of the gas to be supplied to the downstream side (a fuel cell 10 side). It is to be noted that the valve body of the injector 35 is opened or closed to regulate the gas flow rate, and the pressure of the gas to be supplied to the downstream side of the injector 35 is decreased below the gas pressure on the upstream side of the injector 35, so that the injector 35 can be interpreted as a pressure adjustment valve (a pressure reduction valve, a regulator). Moreover, in the present embodiment, the injector can be interpreted as a variable pressure adjustment valve capable of changing the pressure adjustment amount (the pressure reduction amount) of the upstream gas pressure of the injector 35 so that the pressure meets a demanded pressure in a predetermined pressure range based on a gas demand.

It is to be noted that in the present embodiment, as shown in FIG. 1, the injector 35 is arranged on the upstream side of the joining part A1 between the hydrogen supply flow path 31 and the circulation flow path 32. Moreover, as shown by broken lines in FIG. 1, in a case where a plurality of hydrogen tanks 30 are employed as fuel supply sources, the injector 35 may be arranged on the downstream side of a part (a hydrogen gas joining part A2) where the hydrogen gases supplied from the hydrogen tanks 30 are joined.

The circulation flow path 32 is connected to a discharge flow path 38 via a gas-liquid separator 36 and a gas/water discharge valve 37. The gas-liquid separator 36 collects a water content from the hydrogen off-gas. The gas/water discharge valve 37 operates in accordance with a command from the control device 4 to discharge (purge), to the outside, the water content collected by the gas-liquid separator 36 and the hydrogen off-gas (a fuel off-gas) including impurities in the exhaust flow path 32. Moreover, the circulation flow path 32 is provided with a hydrogen pump 39 which pressurizes the hydrogen off-gas in the circulation flow path 32 to feed the gas to a hydrogen supply flow path 31 side. It is to be noted that the hydrogen off-gas discharged through the gas/water discharge valve 37 and the discharge flow path 38 is diluted by a diluter 40 to join the oxidizing off-gas in the exhaust flow path 23.

The control device 4 detects the operation amount of an acceleration operating member (an accelerator or the like) provided in the vehicle, and receives control information such as a demanded acceleration value (e.g., the demanded power generation amount from a load device such as the traction motor 12) to control the operations of various units in the system. It is to be noted that the load device is a generic power consumption device including, in addition to the traction motor 12, an auxiliary device (e.g., the motor of the compressor 24, the hydrogen pump 39, a cooling pump or the like) required for operating the fuel cell 10, an actuator for use in any type of device (a change gear, a wheel control device, a steering device, a suspension device or the like) associated with the running of the vehicle, an air conditioning device (an air conditioner) of a passenger space, illumination, audio or the like.

The control device 4 is constituted of a computer system (not shown). Such a computer system includes a CPU, an ROM, an RAM, an HDD, an input/output interface, a display and the like, and the CPU reads and executes any type of control program recorded in the ROM, to realize various control operations.

Figure 2:
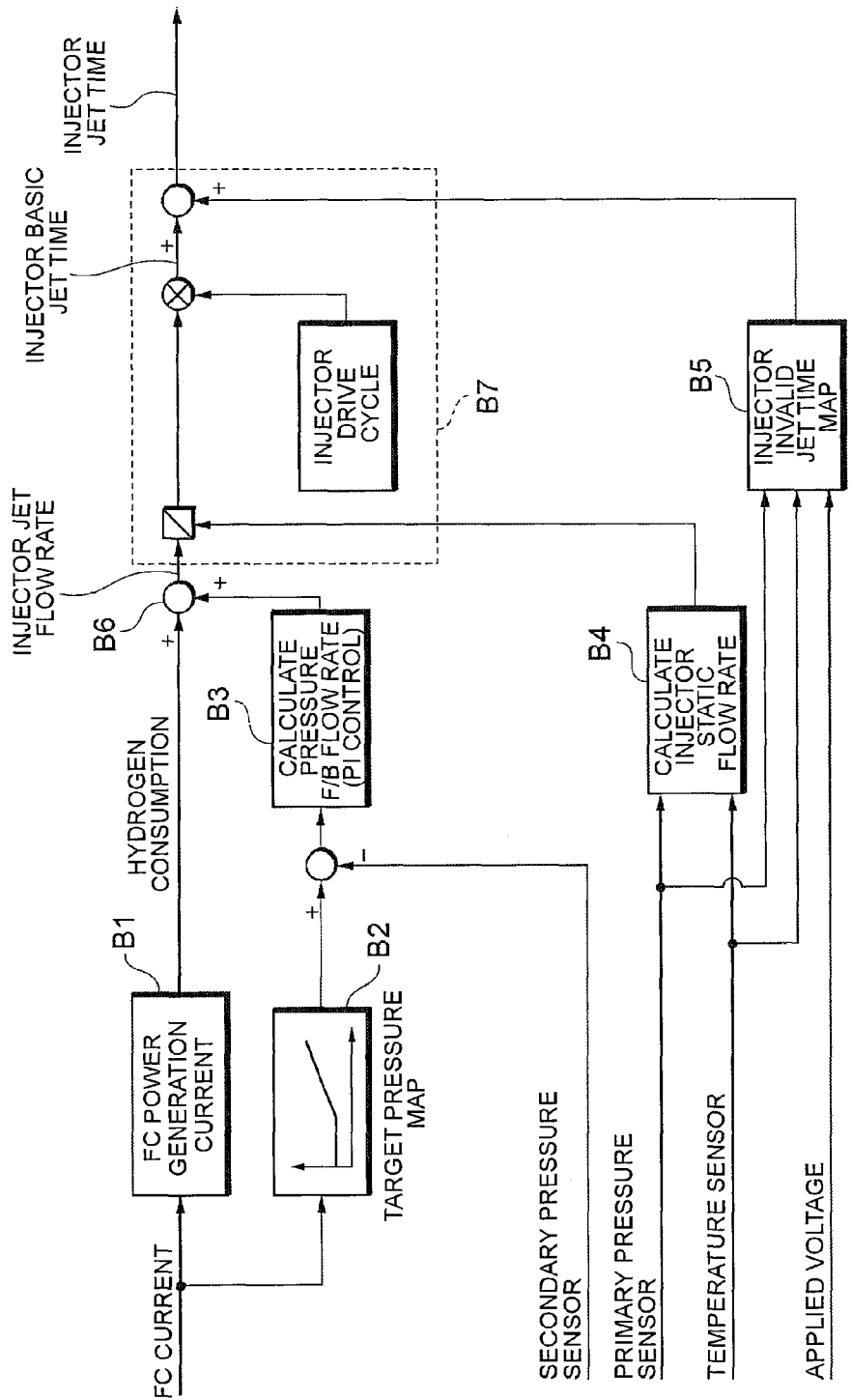
FIG. 2 is a control block diagram for explaining the control configuration of a control device of the fuel cell system shown in FIG. 1.

Specifically, as shown in FIG. 2, the control device 4 calculates the amount (hereinafter referred to as the "hydrogen consumption") of the hydrogen gas consumed by the fuel cell 10 based on the operation state of the fuel cell 10 (the current value of the fuel cell 10 during the power generation detected by the current sensor 13) (a fuel consumption calculating function: B1). In the present embodiment, the hydrogen consumption is calculated and updated for each calculation period of the control device 4 by use of a specific calculation formula indicating a relation between the current value of the fuel cell 10 and the hydrogen consumption.

Moreover, the control device 4 calculates a target pressure value (the target gas supply pressure to the fuel cell 10) of the hydrogen gas in the downstream position of the injector 35 based on the operation state (the current value of the fuel cell 10 during the power generation detected by the current sensor 13) of the fuel cell 10 (a target pressure value calculating function: B2). In the present embodiment, the control device calculates and updates the target pressure value in a position where the secondary pressure sensor 43 is arranged, for each calculation period of the control device 4 by use of a specific map indicating a relation between the current value of the fuel cell 10 and the target pressure value.

Furthermore, the control device 4 calculates a feedback correction flow rate based on a difference between the calculated target pressure value and the pressure value (the detected pressure value) of the downstream position of the injector 35 detected by the secondary pressure sensor 43 (a feedback correction flow rate calculating function: B3). The feedback correction flow rate is a hydrogen gas flow rate to be added to the hydrogen consumption to decrease the difference between the target pressure value and the detected pressure value. In the present embodiment, the feedback correction flow rate is calculated and updated for each calculation period of the control device 4 by use of a PI type feedback control rule.

Moreover, the control device 4 calculates a static flow rate on the upstream side of the injector 35 based on the state of the gas on the upstream side of the injector 35 (the pressure of the hydrogen gas detected by the primary pressure sensor 41 and the temperature of the hydrogen gas detected by the temperature sensor 42) (a static flow rate calculating function: B4). In the present embodiment, by using a specific calculation formula indicating a relation between the pressure and the temperature of the hydrogen gas on the upstream side of the injector 35 and the static flow rate, the static flow rate is calculated and updated for each calculation period of the control device 4.

Furthermore, the control device 4 calculates an invalid jet time of the injector 35 based on the gas state (the pressure and the temperature of the hydrogen gas) on the upstream side of the injector 35 and an applied voltage (an invalid jet time calculating function: B5). Here, the invalid jet time is a time required from a time when the injector 35 receives the control signal from the control device 4 to a time when the jetting is actually started. In the present embodiment, by using a specific map indicating a relation among the pressure and the temperature of the hydrogen gas on the upstream side of the injector 35, the applied voltage and the invalid jet time, the invalid jet time is calculated and updated for each calculation period of the control device 4.

In addition, the control device 4 adds up the hydrogen consumption and the feedback correction flow rate to calculate a jet flow rate of the injector 35 (a jet flow rate calculating function: B6). Then, the control device 4 multiplies the drive cycle of the injector 35 by a value obtained by dividing the jet flow rate of the injector 35 by the static flow rate, to calculate a basic jet time of the injector 35, and the device adds up this basic jet time and the invalid jet time to calculate the total jet time of the injector 35 (a total jet time calculating function: B7). Here, the drive cycle is a stepped (on/off) waveform period indicating the opened or closed state of the jet holes of the injector 35. In the present embodiment, the control device 4 sets the drive cycle to a predetermined value.

Then, the control device 4 outputs the control signal for realizing the total jet time of the injector 35 calculated through the above procedure, to control the gas jet time and the gas jet timing of the injector 35, thereby regulating the flow rate and the pressure of the hydrogen gas to be supplied to the fuel cell 10.

Moreover, the control device 4 diagnoses (performs a closure failure determination of) the injector 35 at the startup of the fuel cell system 1. Specifically, at the startup of the fuel cell system 1, the control device 4 energizes the injector 35, and determines whether or not the downstream pressure (the secondary pressure) of the injector 35 rises in excess of a predetermined threshold value, at a time when this energizing time passes a predetermined reference time (an incoming current time for obtaining a current necessary for opening the injector 35: a closure failure determination condition). In consequence, it is possible to detect whether the injector 35 has the closure failure. That is, the control device 4 functions as failure detection means in the present invention.

Figure 3:
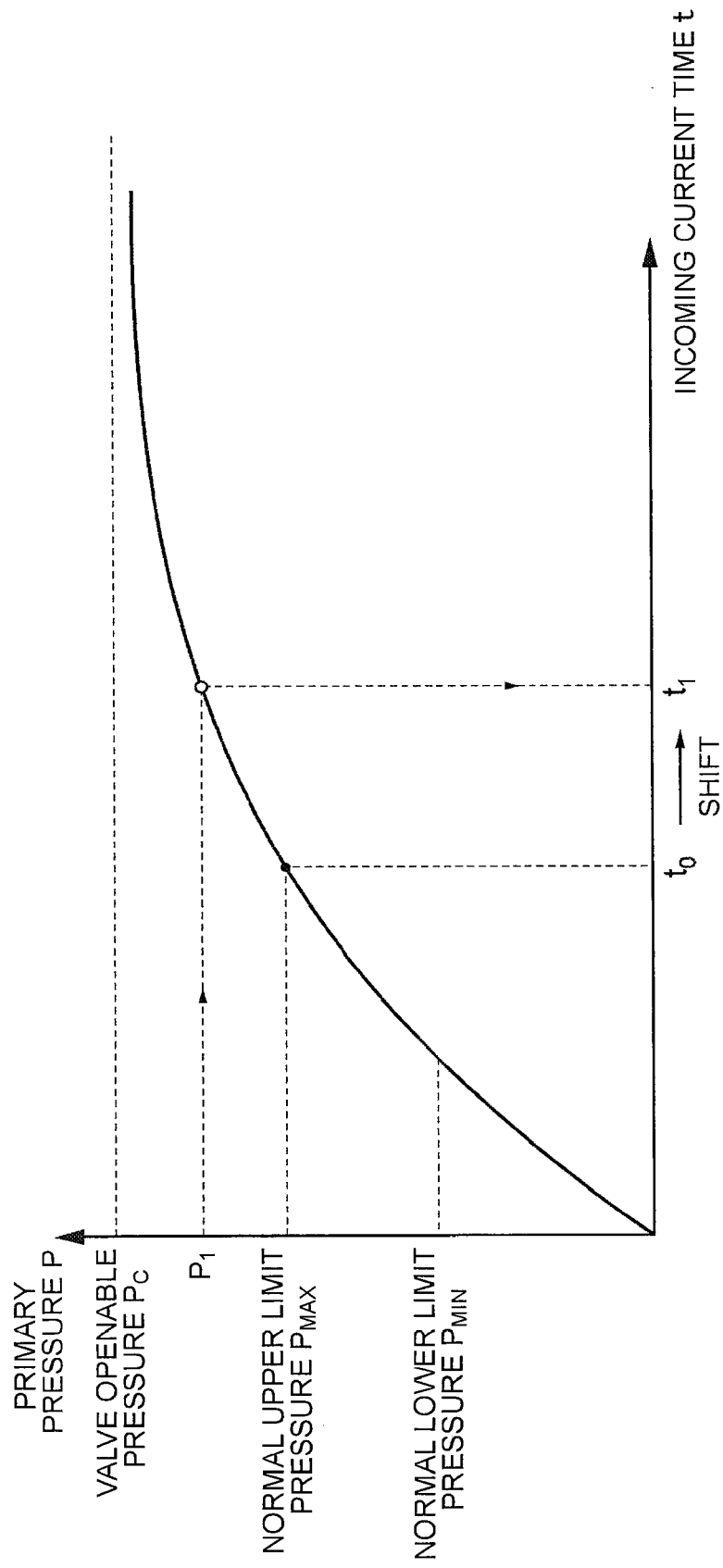
FIG. 3 is a map showing a relation between the closure failure determination conditions of an injector of the fuel cell system shown in FIG. 1 and a primary pressure.

It is to be noted that at the startup of the fuel cell system 1, the control device 4 can perform the closure failure determination of the injector 35, when the upstream pressure (the primary pressure) of the injector 35 is less than a valve openable pressure $P_c$ shown in FIG. 3. Moreover, in the present embodiment, as shown in FIG. 3, a standard incoming current time (the closure failure determination condition) is set to an incoming current time $t_0$ in a case where the upstream pressure of the injector 35 is a normal upper limit pressure $P_{MAX}$. The valve openable pressure $P_c$ is the maximum value of the primary pressure capable of opening the injector 35. Moreover, the normal upper limit pressure $P_{MAX}$ is the upper limit value of the primary pressure for use during the normal operation of the injector 35, and corresponds to a predetermined threshold value in the present invention. As shown in FIG. 3, the valve openable pressure $P_c$ is set to a value larger than the normal upper limit pressure $P_{MAX}$.

Moreover, at the startup of the fuel cell system 1, the control device 4 detects the upstream pressure (the primary pressure) of the injector 35 by use of the primary pressure sensor 41. Furthermore, when the detected primary pressure exceeds the predetermined threshold value (the normal upper limit pressure $P_{MAX}$), the control device 4 changes the closure failure determination condition (the incoming current time) in accordance with the detected pressure value. That is, the control device 4 also functions as determination condition setting means in the present invention. For example, as shown in FIG. 3, when the detected primary pressure is $P_1$ ($>P_{MAX}$)/ the control device 4 changes the incoming current time as the closure failure determination condition from $t_o$ to $t_1$, and determines the closure failure of the injector 35 after an elapse of this new incoming current time $t_1$. On the other hand, when the detected primary pressure is the predetermined threshold value (the normal upper limit pressure $P_{MAX}$) or less, the control device 4 determines the closure failure by employing the standard incoming current time $t_0$.

Figure 4:
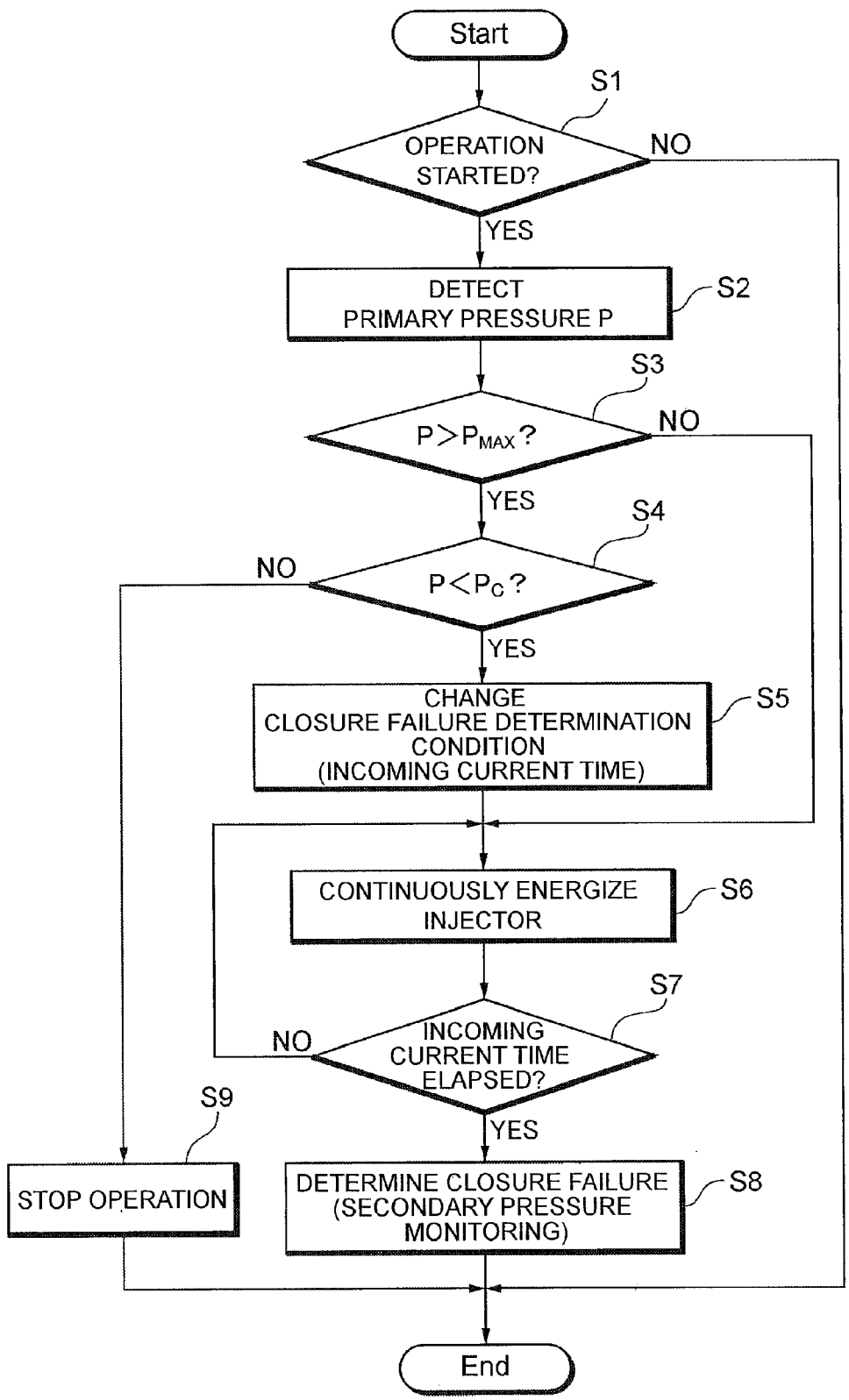
FIG. 4 is a flow chart for explaining a method of diagnosing the injector of the fuel cell system shown in FIG. 1.

Next, a method of diagnosing the injector 35 of the fuel cell system 1 according to the present embodiment (a closure failure determination method) will be described with reference to the map of FIG. 3 and a flow chart of FIG. 4.

During the normal operation of the fuel cell system 1, the hydrogen gas is supplied from the hydrogen tank 30 to a fuel pole of the fuel cell 10 through the hydrogen supply flow path 31, and humidified and regulated air is supplied to an oxidizing pole of the fuel cell 10 through the air supply flow path 21, to generate a power. In this case, the power (the demanded power) to be extracted from the fuel cell 10 is calculated by the control device 4, and the hydrogen gas and the air are supplied into the fuel cell 10 as much as an amount corresponding to the power generation amount. In the present embodiment, the closure failure of the injector 35 at the startup of the system before realizing such a normal operation is determined.

First, the control device 4 of the fuel cell system 1 determines the presence of an operation start signal in an operation stop state (an operation start determination step: S1). Subsequently, when detecting the operation start signal (the ON signal of an ignition switch), the control device 4 detects the pressure (a primary pressure P) of the hydrogen gas on the upstream side of the injector 35 of the hydrogen supply flow path 31 by use of the primary pressure sensor 41 (a primary pressure detection step: S2), to determine whether or not the primary pressure P exceeds the normal upper limit pressure $P_{MAX}$ (a primary pressure determination step: S3). The primary pressure detection step S2 corresponds to a first step in the present invention.

Then, when the control device 4 determines, in the primary pressure determination step S3, that the primary pressure P is the normal upper limit pressure $P_{MAX}$ or less, the device shifts to a continuous energizing step S6 without changing the closure failure determination condition (the standard incoming current time $t_0$ shown in FIG. 3) of the injector 35. On the other hand, when the control device 4 determines, in the primary pressure determination step S3, that the primary pressure P exceeds the normal upper limit pressure $P_{MAX}$, the device determines whether or not the primary pressure P is less than the valve openable pressure $P_c$ (a limit pressure determination step: S4). When the device determines that the primary pressure P is less than the valve openable pressure $P_c$, the device changes the closure failure determination condition of the injector 35 (a determination condition change step: S5). For example, as shown in FIG. 3, when the primary pressure P is $P_1$ ($P_{MAX}<P_1<P_c$), the control device 4 changes the incoming current time as the closure failure determination condition from $t_0$ to $t_1$. The determination condition change step S5 corresponds to a second step in the present invention. It is to be noted that in a case where the control device 4 determines in the limit pressure determination step S4 that the primary pressure P is the valve openable pressure $P_c$ or more, the device judges that the injector 35 cannot be opened, to stop the operation of the fuel cell system 1 (an operation stop step: S9).

After the primary pressure determination step S3 or the determination condition change step S5, the control device 4 continuously energizes the injector 35 for a predetermined time (the continuous energizing step: S6), and determines whether or not this energizing time passes a predetermined reference time (the incoming current time as the closure failure determination condition) (an energizing time determination step: S7). Then, when the energizing time of the injector 35 passes the predetermined reference time, the control device 4 determines whether or not the downstream pressure (the secondary pressure) of the injector 35 rises in excess of the predetermined threshold value (a closure failure determination step: S8). The energizing time determination step S7 and the closure failure determination step S8 correspond to a third step in the present invention. Through the above step group, the closure failure of the injector 35 at the startup of the fuel cell system 1 can be determined. It is to be noted that the threshold value of the secondary pressure employed in the closure failure determination step S8 can appropriately be set in accordance with the pressure in the hydrogen tank 30, and the specifications, scale and the like of the fuel cell 10.

In the fuel cell system 1 according to the above embodiment, when the pressure value (the primary pressure P) of the fuel gas on the upstream side of the injector 35 rises in excess of the predetermined threshold value (the normal upper limit pressure $P_{MAX}$), the closure failure determination condition (the incoming current time) of the injector 35 can be changed in accordance with the primary pressure P. Therefore, even when the injector 35 does not easily open owing to the rising of the primary pressure P, the closure failure determination of the injector 35 can correctly be realized. In consequence, the system can be prevented from falling in a state in which the system cannot start.

Figure 5:
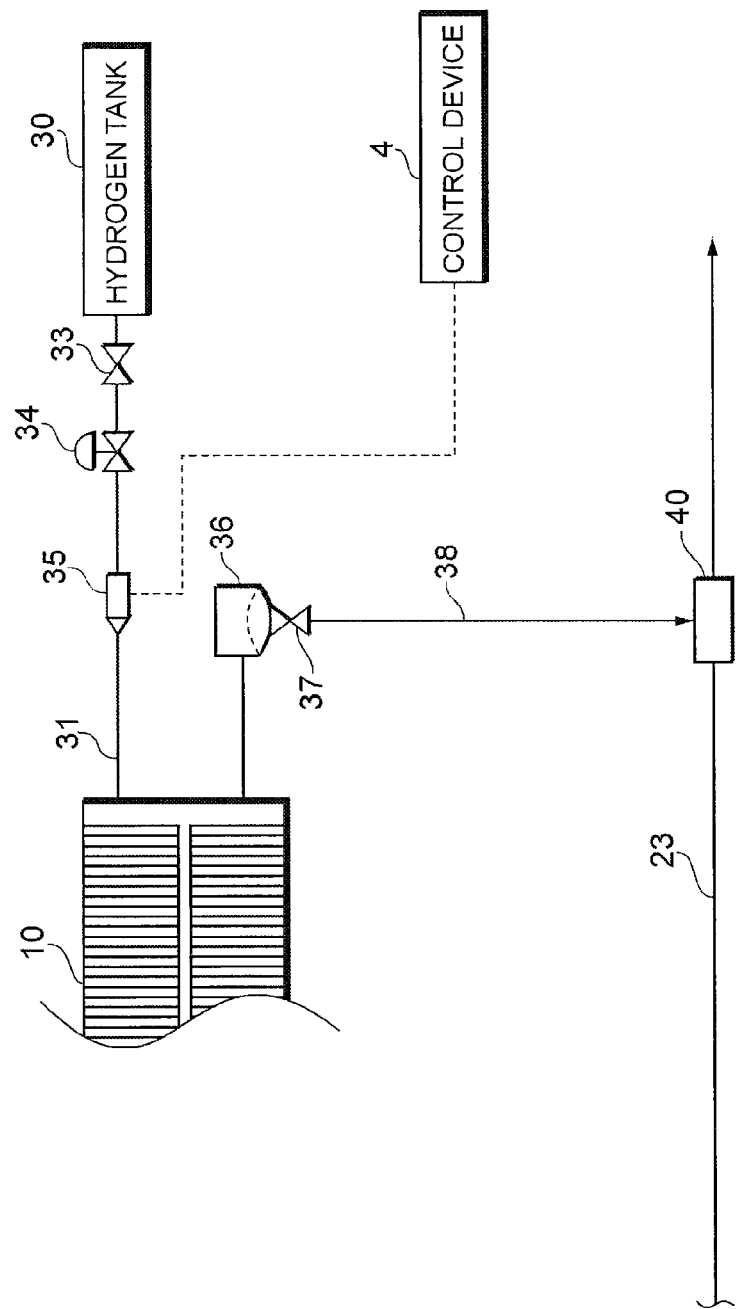
FIG. 5 is a constitution diagram showing a modification of the fuel cell system shown in FIG. 1.

It is to be noted that in the above embodiment, an example has been described in which the hydrogen gas piping system 3 of the fuel cell system 1 is provided with the circulation flow path 32, but as shown in, for example, FIG. 5, a discharge flow path 38 may directly be connected to a fuel cell 10 to eliminate the circulation flow path 32. Even when such a constitution (a dead end system) is employed, in the same manner as in the above embodiment, the closure failure determination condition can be changed in accordance with the upstream pressure (the primary pressure) of the injector 35 to obtain a similar function or effect.

Moreover, in the above embodiment, the temperature rise of the injector 35 is not taken into consideration, but in case of a short time from the stop to the startup of the system or in case of a high outside air temperature, the temperature of a coil constituting a solenoid of the injector 35 rises. When the coil temperature of the injector 35 rises in this manner, a resistance increases, so that the energizing time for obtaining the current necessary for opening the injector 35 sometimes becomes longer than usual. In consideration of such a case, the closure failure determination condition can be corrected based on the coil temperature of the injector 35.

For example, the control device 4 detects the temperature of the coil of the injector 35 by use of a coil temperature sensor (not shown) at the startup of the fuel cell system 1, and can correct the closure failure determination condition by use of a map shown in FIG. 6 when the detected coil temperature exceeds a predetermined threshold value. Specifically, the control device 4 corrects the standard closure failure determination condition (the incoming current time) from $t_0$ to $t_0'$ as shown in FIG. 6 when the detected coil temperature exceeds the predetermined threshold value, and the device can determine the closure failure of the injector 35 after an elapse of this corrected closure failure determination condition $t_0'$. Moreover, when the detected primary pressure is $P_1$ ($>P_{MAX}$) and the detected coil temperature exceeds the predetermined threshold value, as shown in FIG. 6, the changed closure failure determination condition is corrected from $t_1$ to $t_1'$, and the closure failure of the injector 35 can be determined after an elapse of this corrected closure failure determination condition $t_1'$.

In this case, the incoming current time as the closure failure determination condition can be corrected based on the temperature of the injector 35, so that the determination of the closure failure of the injector 35 can correctly be realized even in a case where the energizing time for obtaining the current necessary for opening the injector 35 becomes longer than usual owing to the rising of the temperature of the injector 35 and the increasing of the resistance.

Moreover, in the above embodiment, an example has been described in which the injector 35 is employed as the on-off valve in the present invention, but the on-off valve is not limited to the injector 35 as long as the gas state on the upstream side of the supply flow path (the hydrogen supply flow path 31) is regulated to supply the gas to the downstream side.

INDUSTRIAL APPLICABILITY

As described in the above embodiment, a fuel cell system according to the present invention can be mounted on a fuel cell vehicle, and may be mounted on any type of mobile article (a robot, a ship, an airplane or the like) other than the fuel cell vehicle. Moreover, the fuel cell system according to the present invention may be applied to a stational power generation system which is used as a power generation facility for a construction (a housing, a building or the like).

The invention claimed is:
1. A fuel cell system comprising:
a fuel cell;
a fuel supply flow path which allows a fuel gas supplied from a fuel supply source to flow to the fuel cell;
an injector which regulates the state of the gas on the upstream side of this fuel supply flow path to supply the gas to the downstream side;
a failure detection device to detect whether the injector has a closure failure;
a pressure sensor which detects the pressure value of the fuel gas on the upstream side of the injector; and
a determination condition setting device to set, based on the pressure value detected by the pressure sensor, the conditions of determination of the closure failure of the injector,
wherein the failure detection device determines, based on the closure failure determination conditions set by the determination condition setting device, whether the injector has the closure failure, and wherein the determination condition setting device sets an energizing time to obtain a current value necessary for the opening of the injector as the closure failure determination condition, and changes the energizing time in accordance with the detected pressure value, when the detected pressure value exceeds a predetermined threshold value.

2. The fuel cell system according to claim 1, wherein the determination condition setting device corrects the energizing time based on the temperature of the injector.

3. A method of diagnosing an injector of a fuel cell system including a fuel cell, a fuel supply flow path which allows a fuel gas supplied from a fuel supply source to flow to the fuel cell, and an injector which regulates the state of the gas on the upstream side of this fuel supply flow path to supply the gas to the downstream side, the method comprising:

a first step of detecting the pressure value of the fuel gas on the upstream side of the injector;

a second step of setting, based on the pressure value detected by the first step, the conditions of determination of a closure failure of the injector; and a third step of determining, based on the closure failure determination conditions set by the second step, whether the injector has the closure failure, wherein the determination condition setting device sets an energizing time to obtain a current value necessary for the opening of the injector as the closure failure determination condition, and changes the energizing time in accordance with the detected pressure value, when the detected pressure value exceeds a predetermined threshold value.

* * * * *